(12) United States Patent
Zheng (10) Patent No.: US 12,142,272 B2
(45) Date of Patent: Nov. 12, 2024

(54) VOICE INFORMATION PROCESSING APPARATUS AND VOICE INFORMATION PROCESSING METHOD

(71) Applicant: ALPS ALPINE CO., LTD., Tokyo (JP)

(72) Inventor: Hongda Zheng, Dalian (CN)

(73) Assignee: ALPS ALPINE CO., LTD., Tokyo (JP)

( * ) Notice: Subject to any disclaimer, the term of this patent is extended or adjusted under 35 U.S.C. 154(b) by 355 days.

(21) Appl. No.: 17/470,467

(22) Filed: Sep. 9, 2021

(65) Prior Publication Data

US 2022/0093099 A1    Mar. 24, 2022

(30) Foreign Application Priority Data

Sep. 22, 2020   (CN) ......................... 202010999526.0

(51) Int. Cl.
*G10L 15/22*     (2006.01)
*G06V 40/16*    (2022.01)
(Continued)

(52) U.S. Cl.
CPC ............ *G10L 15/22* (2013.01); *G06V 40/161* (2022.01); *G10L 15/25* (2013.01); *G10L 15/26* (2013.01); *H04M 1/72* (2013.01); *B60R 16/0373* (2013.01); *G01C 21/3608* (2013.01); *G01C 21/3629* (2013.01)

(58) Field of Classification Search
CPC ......... G10L 15/22; G10L 15/25; G10L 15/26; G06V 40/161; H04M 1/72; B60R 16/0373; G01C 21/3608; G01C 21/3629
See application file for complete search history.

(56) References Cited

U.S. PATENT DOCUMENTS

| 11,620,994 B2 * | 4/2023 | Varges | G10L 15/30 |
| | | | 704/251 |
| 2004/0260549 A1 * | 12/2004 | Matsumoto | G10L 15/20 |
| | | | 704/247 |

(Continued)

FOREIGN PATENT DOCUMENTS

| EP | 3564948 A1 | 11/2019 |
| JP | 2003-319280 | 11/2003 |
| JP | 2007-151188 | 6/2007 |

OTHER PUBLICATIONS

Extended European Search Report issued Feb. 2, 2022 in EP Application No. 211966387, 10 pages.

*Primary Examiner* — Brian L Albertalli
(74) *Attorney, Agent, or Firm* — Crowell & Moring LLP (57) ABSTRACT

A voice information processing apparatus sequentially converts an utterance of a user into text during a voice reception period that is a period in which an uttered voice to be converted into text is received from a user, and in a case where it can be regarded that the utterance of the user has been interrupted, the voice information processing apparatus automatically causes utterance content already uttered by the user to be output by a voice during the voice reception period. As a result, the voice information processing apparatus can cause the user to recognize a content of a sentence that has been uttered by the user so far and converted into text, when it can be regarded that the utterance of the user has been interrupted.

16 Claims, 4 Drawing Sheets

(51) Int. Cl.
*G10L 15/25* (2013.01)
*G10L 15/26* (2006.01)
*H04M 1/72* (2021.01)
B60R 16/037 (2006.01)
G01C 21/36 (2006.01)

(56) References Cited

U.S. PATENT DOCUMENTS

| | | |
|---|---|---|
| 2005/0267759 A1* | 12/2005 | Jeschke ............... B60R 16/0373 |
| | | 704/E15.04 |
| 2009/0187406 A1 | 7/2009 | Sakuma et al. |
| 2011/0223893 A1* | 9/2011 | Lau ......................... G10L 15/22 |
| | | 455/414.1 |
| 2017/0162197 A1* | 6/2017 | Cohen ..................... G10L 15/22 |
| 2017/0235361 A1* | 8/2017 | Rigazio ................... G10L 15/22 |
| | | 715/710 |
| 2019/0206397 A1 | 7/2019 | Zhou |
| 2020/0020352 A1 | 1/2020 | Ito et al. |
| 2020/0241824 A1* | 7/2020 | Lee ....................... G06F 3/1423 |
| 2020/0302926 A1* | 9/2020 | Aggarwal ............... G10L 15/22 |
| 2021/0073561 A1* | 3/2021 | Ben Abdelaziz ...... G06V 40/23 |

\* cited by examiner

VOICE INFORMATION PROCESSING APPARATUS AND VOICE INFORMATION PROCESSING METHOD

RELATED APPLICATION

The present application claims priority to Chinese Patent Application Number 202010999526.0, filed Sep. 22, 2020, the entirety of which is hereby incorporated by reference.

BACKGROUND

1. Field of the Invention

The present disclosure relates to a voice information processing apparatus and a voice information processing method, and more particularly, to be suitable for use in a voice information processing apparatus and a voice information processing method that convert uttered voice of a user into text.

2. Description of the Related Art

Conventionally, there is a voice information processing apparatus that inputs an uttered voice of a user, converts the input voice into text, and transmits the text as a chat application message or a mail. By using this type of device, the user can transmit sentences of desired contents converted into text to the other party by utterance without performing an operation by hand.

Note that JP 2007-151188 A describes a technology in which, in a telephone, in a case where there is an interruption while a phone number is being input, data processed so far is temporarily saved in a nonvolatile memory, and the data is returned after the interruption processing is finished. In addition, JP 2003-319280 A describes a technology in which, in a digital broadcast receiving system, in a case where a lack of a signal occurs while a received signal is recorded in a recording/reproducing device, a missing information signal corresponding to a missing time is generated and recorded in the recording/reproducing device, and for the missed portion, an image or a voice is output on the basis of the generated and recorded missing information signal.

When the user converts his/her own uttered voice into text using the above-described conventional voice information processing apparatus, the user's utterance may be interrupted during the utterance for some reason. Then, after the utterance is interrupted, the cause of the interruption is eliminated, and when utterances to be converted into text are resumed, the user does not accurately memorize the content of the sentence uttered so far, and it is often not possible to know exactly where to continue a sentence with what content. In such a case, the user had to cancel the sentence that had been converted into the utterance text and start the utterance from the beginning of the sentence, which was complicated for the user.

SUMMARY

The present disclosure has been made to solve such a problem, and an object of the present disclosure is to enable a user to complete conversion of a desired sentence into text without performing complicated work in a case where the utterance is interrupted while the utterance is being converted into text.

In order to solve the above problem, in the present disclosure, utterance of a user is sequentially converted into text during a voice reception period that is a period in which uttered voice to be converted into text is received from the user, while in a case where it can be regarded that the utterance of the user has been interrupted, utterance content already uttered by the user during the voice reception period is automatically output by voice.

According to the present disclosure as described above, in a situation where the user's utterance can be regarded as being interrupted, the utterance content uttered by the user so far is automatically output as a voice. Therefore, by listening to the output voice, the user can grasp the content of the sentence that the user has uttered so far and recognize how far the user has uttered and where the user should continue. As a result, the user can resume the utterance from the middle of the sentence without canceling the already-textualized sentence. Therefore, according to the present disclosure, in a case where the utterance is interrupted while the utterance is being converted into text, the user can complete the conversion of a desired sentence into text without performing complicated work.

DETAILED DESCRIPTION OF THE PREFERRED EMBODIMENTS

First Embodiment

Figure 1:
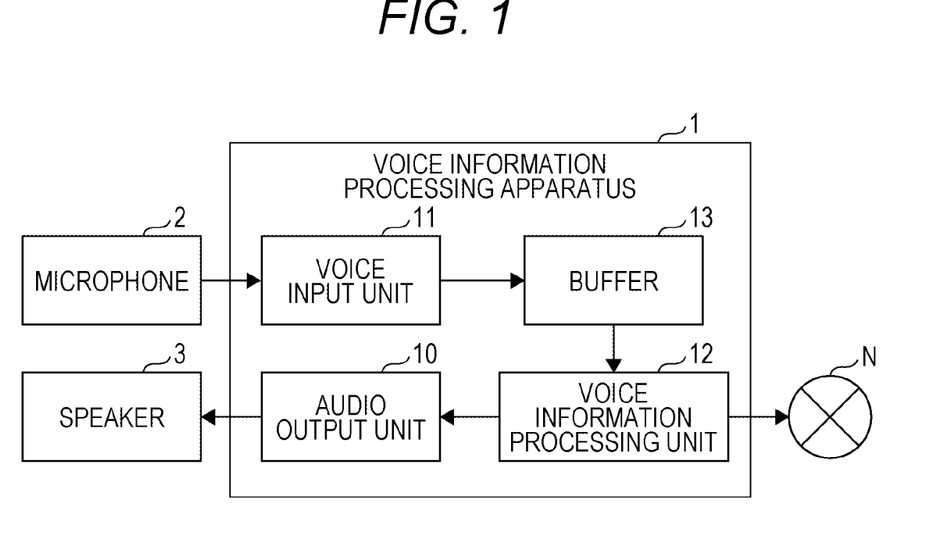
FIG. 1 is a block diagram illustrating a configuration example of a voice information processing apparatus according to a first embodiment of the present invention.

A first embodiment of the present invention will be described below based on the drawings. FIG. 1 is a block diagram illustrating a functional configuration example of a voice information processing apparatus 1. The voice information processing apparatus 1 according to the first embodiment is an apparatus mounted in a vehicle. The voice information processing apparatus 1 has a function of providing a user with an environment in which text chat in which a plurality of persons exchange text messages is performed. In particular, the voice information processing apparatus 1 according to the first embodiment has a function of, at the time of text chat, inputting a voice uttered by an occupant (hereinafter, simply referred to as a "user") who uses the apparatus within a voice reception period (described later), converting a sentence indicated by the input voice into text, and transmitting the converted text as a message. The user can use the function to create and transmit a message to be transmitted to the other party in a text chat without inputting by hand. Hereinafter, the vehicle in which the voice information processing apparatus 1 is mounted is referred to as the "host vehicle".

As illustrated in FIG. 1, a microphone 2 and a speaker 3 are connected to the voice information processing apparatus 1. The microphone 2 is provided at a position where an uttered voice of a user onboard the host vehicle can be collected. The microphone 2 collects the voice and outputs a voice signal of the collected voice. The speaker 3 is provided inside the vehicle, receives a voice signal, and emits a voice based on the input voice signal.

As illustrated in FIG. 1, the voice information processing apparatus 1 includes a audio output unit 10, a voice input unit 11, and a voice information processing unit 12 as functional configurations. Each of the functional blocks 10 to 12 described above can be implemented by any of hardware, a digital signal processor (DSP), or software. For example, in a case where the functional blocks are configured by software, each of the above functional blocks 10 to 12 substantially includes, for example, a CPU, a RAM, and a ROM of a computer, and is achieved by operation of a program stored in a recording medium, such as a RAM, a ROM, a hard disk, or a semiconductor memory. Among the functional configurations, the audio output unit 10 inputs a voice signal, drives the speaker 3 on the basis of the input voice signal, and causes the speaker 3 to emit a voice based on the voice signal.

Hereinafter, an operation of the voice information processing apparatus 1 when a sentence uttered by the user is converted into text and transmitted as a message in a case where an operation mode is a chat mode will be described. The chat mode is the operation mode in which the user can perform text chat with a desired party (or a plurality of parties) using the voice information processing apparatus 1. The mode is shifted to the chat mode by a user's operation on an operation means (which may be a touch panel) of the voice information processing apparatus 1 or an instruction by voice. At that time, a setting necessary for transmission of a message, such as designation of a party with whom text chat is to be performed, is also appropriately performed.

In a case where it is desired to convert a desired sentence into text using the voice information processing apparatus 1 and transmit the text as a message, the user utters a message start word including a predetermined fixed phrase, utters a sentence desired to be converted into text, and then utters a message end word including a predetermined fixed phrase. The message start word is, for example, a sentence "message start", and the message end word is, for example, a sentence "message end". That is, in the first embodiment, the period from the end of the utterance of the message start word to the start of the utterance of the message end word is a period in which the voice of the sentence to be converted into text is accepted. This period corresponds to a "voice reception period".

Furthermore, in the first embodiment, in a case where the user wishes to transmit, as a message, a sentence uttered during the voice reception period after uttering the message end word, the user utters the message transmission word. The message transmission word is, for example, a sentence "message transmission". Transmission of the sentence uttered by the user to the other party is executed according to the utterance of the message transmission word by the user.

While the operation mode is the chat mode, the voice input unit 11 inputs a voice signal output from the microphone 2, performs analog/digital conversion processing including sampling, quantization, and encoding on the voice signal, and performs other signal processing to generate voice data (hereinafter referred to as "input voice data"), and buffers the voice data in the buffer 13. The buffer 13 is a storage area formed in a work area such as a RAM. The input voice data is data of a voice waveform sampled at a predetermined sample cycle (for example, 16 kHz).

The voice information processing unit 12 analyzes the input voice data buffered in the buffer 13 as needed, and monitors whether or not the voice waveform of the message start word appears in the input voice data. In the first embodiment, a voice pattern of the message start word (a pattern of a voice waveform when the message start word is uttered) is registered in advance. A plurality of voice patterns may be registered. The voice information processing unit 12 compares the voice waveform of the input voice data with the voice pattern related to the message start word as needed and calculates similarity by a predetermined method, and in a case where the similarity is equal to or greater than a certain value, determines that the waveform of the message start word appears in the input voice data. Hereinafter, detecting that the waveform of the message start word appears in the input voice data by the voice information processing unit 12 is appropriately expressed as "the voice information processing unit 12 detects the message start word".

When the message start word is detected, the voice information processing unit 12 executes voice recognition on the input voice data buffered in the buffer 13 at any time, converts a sentence recorded in the input voice data into text, and describes the text as text in sentence data stored in a storage unit (not illustrated). Hereinafter, this processing is referred to as "text conversion processing". Note that conversion of input voice data into text is appropriately performed by performing morphological analysis, syntactic structure analysis, semantic structure analysis, and the like on the basis of the existing technologies related to natural language processing. An artificial intelligence technology may be used as a part of the technology. In addition, the voice information processing unit 12 may be configured to execute the text conversion processing in cooperation with an external device. For example, the configuration may be such that the text conversion processing is executed in cooperation with a cloud server that provides a service for converting audio data into text.

In parallel with the text conversion processing, the voice information processing unit 12 analyzes the input voice data buffered in the buffer 13 as needed, and monitors whether or not the voice waveform of the message end word appears in the input voice data. The monitoring is executed in a similar manner to the monitoring of whether the voice waveform of the message start word appears on the basis of the voice pattern of the message end word registered in advance.

When detecting that the voice waveform of the message end word appears in the input voice data, the voice information processing unit 12 ends the text conversion processing. Thereafter, the voice information processing unit 12 analyzes the input voice data buffered in the buffer 13 as needed, and monitors whether or not the voice waveform of the message transmission word appears in the input voice data. The monitoring is executed by a method similar to the above-described monitoring of whether or not the voice waveform of the message start word appears on the basis of the voice pattern of the message transmission word registered in advance.

When detecting that the voice waveform of the message transmission word appears in the input voice data, the voice information processing unit 12 transmits a message regarding the text described in the sentence data to a predetermined server via a network N according to a protocol.

Further, the voice information processing unit 12 analyzes the input voice data buffered in the buffer 13 as needed in parallel with the text conversion processing, and monitors whether or not a voice waveform of a cancel word appears in the input voice data. The cancel word is, for example, a sentence "cancel message". The monitoring is executed by a method similar to the monitoring of whether or not the voice waveform of the message start word appears on the basis of the voice pattern of the cancel word registered in advance. When detecting that the voice waveform of the cancel word appears in the input voice data, the voice information processing unit 12 cancels the text conversion processing and further deletes the text described in the sentence data so far. Thereafter, the voice information processing unit 12 starts monitoring again whether or not the voice waveform of the message start word appears in the input voice data.

Furthermore, the voice information processing unit 12 executes the following processing during the execution of the text conversion processing, that is, during a period from the detection of the message start word to the end or cancellation of the text conversion processing. That is, it is determined whether or not a period during which the user's utterance is not performed has continued for a predetermined time or longer. The fact that the period during which the user's utterance is not performed continues for a predetermined time or longer means the following. For example, it is assumed that the user utters a sentence "Hi." In this case, it means that a predetermined time or longer has elapsed without the user's utterance being performed after the utterance of "Hi." is completed.

The voice information processing unit 12 analyzes the input voice data, and in a case where a sound pressure value of the voice waveform once exceeds a first threshold value (threshold value for determining that the utterance has been performed), and is then smaller than or equal to a second threshold value (threshold value for determining that the utterance has not been performed, which may be the same value as the first threshold), and the second threshold or less continues for a predetermined time or longer, determines that the period during which the user's utterance is not performed is a predetermined time or longer. However, the determination method may be any method.

In a case where it is detected that the period in which the user's utterance is not performed has continued for a predetermined time or longer, the voice information processing unit 12 executes the following processing. That is, the voice information processing unit 12 causes the audio output unit 10 to output, by voice, the sentence indicated by the text (text already-generated in the text conversion processing) described so far in the sentence data. Hereinafter, the voice output by the audio output unit 10 in this manner is referred to as "already-textualized voice", and the voice information processing unit 12 causing the audio output unit 10 to output the already-textualized voice is simply expressed as "the voice information processing unit 12 outputs the already-textualized voice". The already-textualized voice corresponds to "voice corresponding to utterance content already uttered by the user during the voice reception period" in the claims.

Describing the processing of the voice information processing unit 12 in detail, the voice information processing unit 12 generates voice data for outputting a sentence indicated by a text described in the sentence data as a voice. The generation of the voice data is appropriately performed by existing technology such as a voice synthesis technology. Then, the voice information processing unit 12 outputs the voice signal based on the voice data to the audio output unit 10 to emit the voice based on the voice data from the speaker 3.

Thereafter, the voice information processing unit 12 continues to execute the conversion into the text conversion processing, and converts the uttered sentence into text in a case where there is an utterance to be converted into text. In a case where there is an utterance of the user and the period in which the utterance of the user is not performed continues for a predetermined time or longer, the voice information processing unit outputs the already-textualized voice again. The voice information processing unit 12 also detects the message end word and the cancel word in parallel.

Under the above configuration, the voice information processing apparatus 1 operates, for example, in the following manner. For example, it is assumed that a user wants to speak a sentence "I am heading by the car now. It's past point A. Arrival time is 13:00. Arrival may be delayed because the road is congested. I will contact you again when I get closer to you." Then, it is assumed that the user utters the message start word, and then interrupts the utterance for some reason when uttering the sentence "I am heading by car now. It is just past point A." An example of the reason is that a vehicle approaches an intersection or starts parking, and thus it is necessary to concentrate on driving, or it is necessary to perform work such as paying a toll at a gate on a road. Note that the portion uttered by the user is converted into text by the text conversion processing of the voice information processing unit 12, and the text is described in the sentence data.

In this case, after the utterance of the sentence "It is just past point A." is completed, when a predetermined time or longer has elapsed without the utterance being performed, the voice information processing unit 12 of the voice information processing apparatus 1 according to the first embodiment causes the audio output unit 10 to automatically output the voice related to the already-generated text. In this example, the sentence "I'm heading by car now. It's just past point A" is output by voice.

As a result of performing the above processing, the following effects are obtained. In other words, when resuming the utterance to be converted into text after interrupting the utterance while the utterance is converted into text, the user is required to newly make an utterance from the sentence immediately after the portion where the utterance has been completed. However, there may be a case where the user does not accurately memorize the content of the sentence uttered so far, and does not accurately know from where and what the content of the sentence should be uttered. In the present example, the user should start the utterance from "the estimated time of arrival ~," but may not accurately know how far the user has uttered and where the user should make the utterance. In such a case, by uttering the cancel word, it is possible to temporarily cancel the voice input so far and perform work regarding conversion of a desired sentence into text and transmission as a message from the beginning, but such work is troublesome for the user.

On the other hand, according to the first embodiment, the following effects are obtained. In a case where the period during which the user does not utter continues for a considerable time, it can be considered that the user's utterance is interrupted. This is because, in general, in a case where the user utters a series of sentences to be transmitted as a message for conversion into text, the user does not utter for an unnecessarily long period of time during the utterance.

Then, according to the voice information processing apparatus 1 according to the first embodiment, in a case where the user's utterance can be regarded as being interrupted, a sentence converted into text by the user so far is automatically output as a voice. Therefore, the user can grasp the content of the sentence that he/she has uttered so far and converted into text, by listening to the output voice. As a result, the user can resume the utterance from the middle without canceling the already-textualized sentence. Therefore, according to the first embodiment, in a case where the utterance is interrupted while the utterance is converted into text, the user can complete the conversion of a desired sentence into text without performing complicated work.

Note that the user may forget the fact that the user has made the utterance to be converted into text after interrupting the utterance to be converted into text. In such a case, according to the first embodiment, since the sentence already converted into text on the basis of the utterance of the user is automatically output as a voice, it is possible to make the user realize that the user has begun an utterance (naturally, the content of the already uttered sentence can be recognized).

Figure 2:
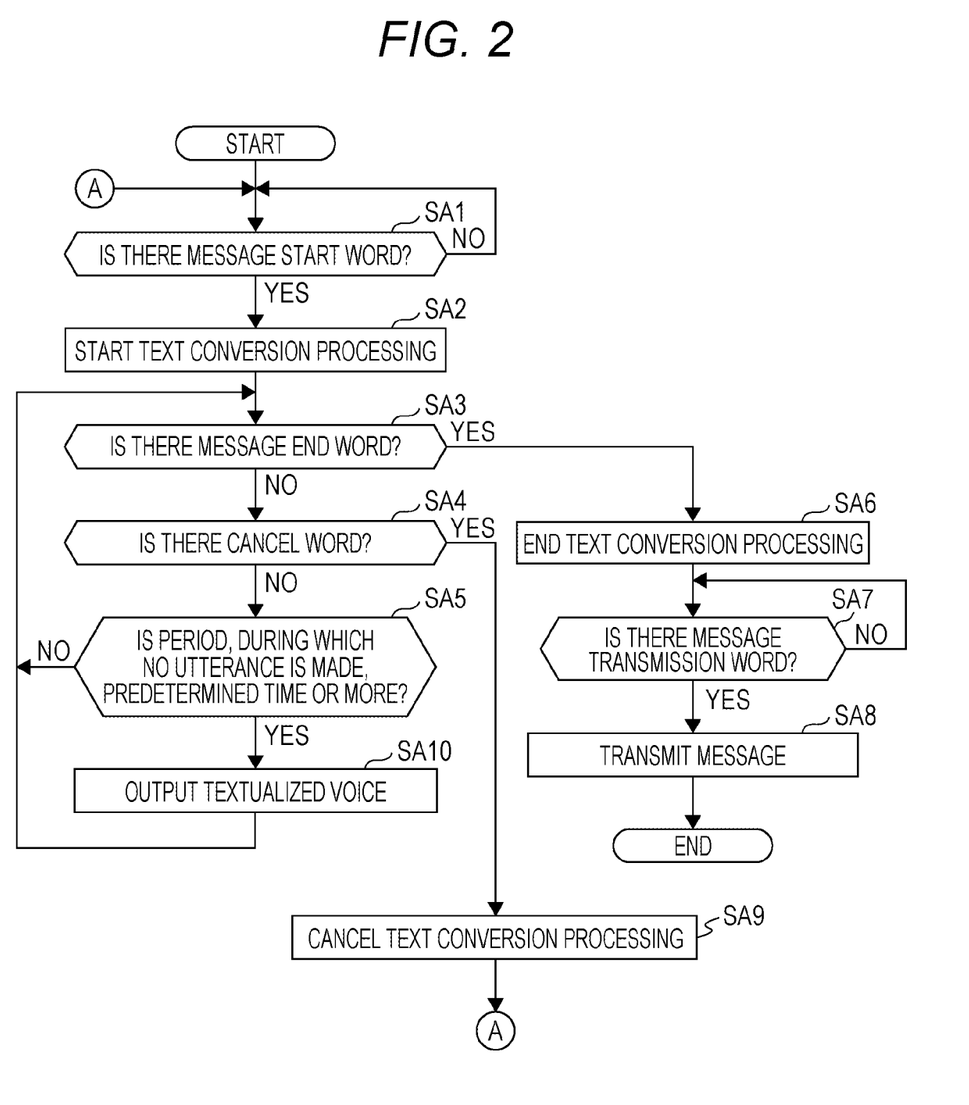
FIG. 2 is a flowchart illustrating an operation example of the voice information processing apparatus according to the first embodiment of the present invention.

Next, a voice information processing method by the voice information processing apparatus 1 will be described with reference to a flowchart. The flowchart of FIG. 2 illustrates the operation of the voice information processing unit 12 when the chat mode is on. As illustrated in FIG. 2, the voice information processing unit 12 analyzes the input voice data buffered in the buffer 13 as needed, and monitors whether or not the voice waveform of the message start word appears in the input voice data (step SA1). In a case where the voice waveform of the message start word appears (step SA1: YES), the voice information processing unit 12 starts the text conversion processing (step SA2).

Next, the voice information processing unit 12 monitors whether or not the voice waveform of the message end word appears in the input voice data (step SA3), whether or not the voice waveform of the cancel word appears in the input voice data (step SA4), and whether or not the period in which the utterance is not performed is longer than or equal to a predetermined time (step SA5). In a case where the voice waveform of the message end word appears in the input voice data (step SA3: YES), the voice information processing unit 12 ends the text conversion processing (step SA6) and monitors whether or not the voice waveform of the message transmission word appears in the input voice data (step SA7). In a case where the voice waveform of the message transmission word appears in the input voice data (step SA7: YES), the voice information processing unit 12 transmits a message for the text described in the sentence data (step SA8).

In a case where the voice waveform of the cancel word appears in the input voice data (step SA4: YES), the voice information processing unit 12 cancels the text conversion processing (step SA9) and returns the processing procedure to step SA1.

In a case where the period during which no utterance is performed is longer than or equal to the predetermined time (step SA5: YES), the voice information processing unit 12 causes the audio output unit 10 to output, by voice, the sentence indicated by the text described so far in the sentence data (text already-generated in the text conversion processing) (step SA10). Thereafter, the voice information processing unit 12 returns the processing procedure to step SA3.

Modification of First Embodiment

In the first embodiment described above, in a case where a period during which no utterance is performed is longer than or equal to a predetermined time in a voice reception period, the voice information processing unit 12 is configured to cause the audio output unit 10 to output a sentence indicated by text that has been already-generated as a voice (already-textualized voice). In this regard, the voice information processing unit 12 may be configured to cause the audio output unit 10 to output a voice (recorded voice of user's utterance) based on voice data stored in a buffer 13, instead of the already-textualized voice. In this configuration, a voice (recorded voice of user's utterance) output instead of the already-textualized voice corresponds to "a voice corresponding to utterance content already uttered by a user during the voice reception period" in the claims.

In this case, for example, the voice information processing unit 12 cuts out voice data corresponding to a portion already uttered by the user during the voice reception period from the input voice data stored in the buffer 13, and outputs a voice signal based on the cut out voice data to the audio output unit 10. Note that this modification can be applied to a second embodiment (including a modification of the second embodiment) to be described later.

Second Embodiment

Figure 3:
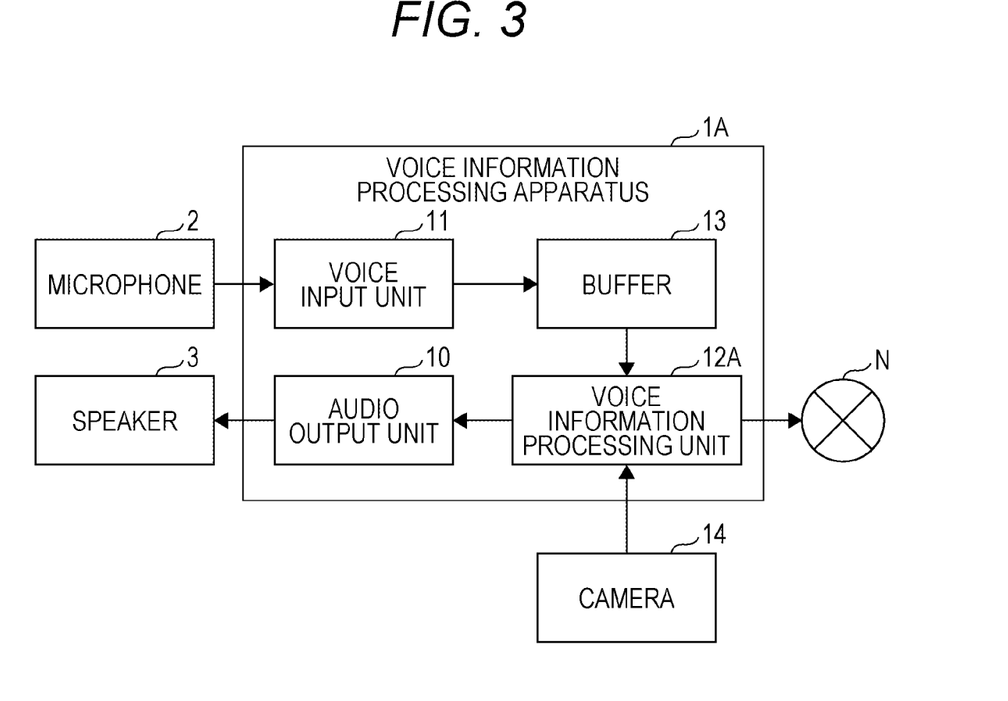
FIG. 3 is a block diagram of a functional configuration example of a voice information processing apparatus according to a second embodiment of the present invention.

Next, a second embodiment will be described. FIG. 3 is a block diagram illustrating a functional configuration example of a voice information processing apparatus 1A according to the second embodiment. In the following second embodiment, the same components as those of the first embodiment will be denoted by the same reference signs and a detailed description thereof will be omitted. Note that, in the second embodiment, for convenience of description, it is assumed that a user who uses the voice information processing apparatus 1A is a driver. However, this is for convenience of description, and an occupant other than the driver may be a user who uses the voice information processing apparatus 1A.

As is clear from the comparison between FIGS. 1 and 3, the voice information processing apparatus 1A according to the second embodiment includes a voice information processing unit 12A instead of the voice information processing unit 12 according to the first embodiment. Furthermore, a camera 14 is connected to the voice information processing apparatus 1A according to the second embodiment. The camera 14 is provided at a position where an upper body including a user's face can be photographed when the user is seated on a driver's seat. The camera 14 performs photographing at a predetermined cycle, and outputs captured image data based on the photographed result to the voice information processing unit 12A.

The voice information processing unit 12 according to the first embodiment causes the voice output unit 10 to output a voice (already-textualized voice) related to a sentence that has already been converted into text when a period in which the user's utterance is not performed becomes a predetermined time or longer during the voice reception period. On the other hand, the voice information processing unit 12A according to the second embodiment outputs the already-textualized voice in a case where the user's utterance has not been performed for a predetermined time or longer after the user's face moves in a mode of looking outside through a side window.

More specifically, when detecting a message start word, the voice information processing unit 12A recognizes the image (the image of the upper body of the user) of the upper body of the human in the captured image data with existing recognition technology with respect to the captured image data input from the camera 14 at a predetermined cycle, continuously analyzes the image of the upper body, and monitors whether or not an operation (operation of facing the side window side and looking outside) performed in a case where the user is looking outside through the side window has been performed. The monitoring is performed based on an existing motion recognition technology. It is a matter of course that the monitoring may be performed using a model learned by deep learning or another machine learning method.

Then, in a case where the voice information processing unit 12A detects that the operation performed in a case where the user is looking outside through the side window has been performed by the user, when a period in which the user's utterance is not further performed continues for a predetermined time or longer after the detection, the voice information processing unit automatically outputs the already-textualized voice.

According to the second embodiment, the following effects are obtained. When the utterance of the user can be regarded as being interrupted, the sentence converted into text by the user so far is automatically output as a voice, so that the same effect as that of the first embodiment can be obtained. Furthermore, in a case where the user has not made an utterance to be converted into text for a predetermined time or longer after looking outside through the side window, it is possible to strongly estimate that the driver has interrupted the utterance to be converted into text due to looking at the outside scenery, as compared with a case where a period in which there is no utterance continues for a predetermined time or longer. Based on this, according to the second embodiment, it is possible to output the already-textualized voice in a situation where it can be more strongly estimated that the utterance is interrupted, as compared with the first embodiment.

Figure 4:
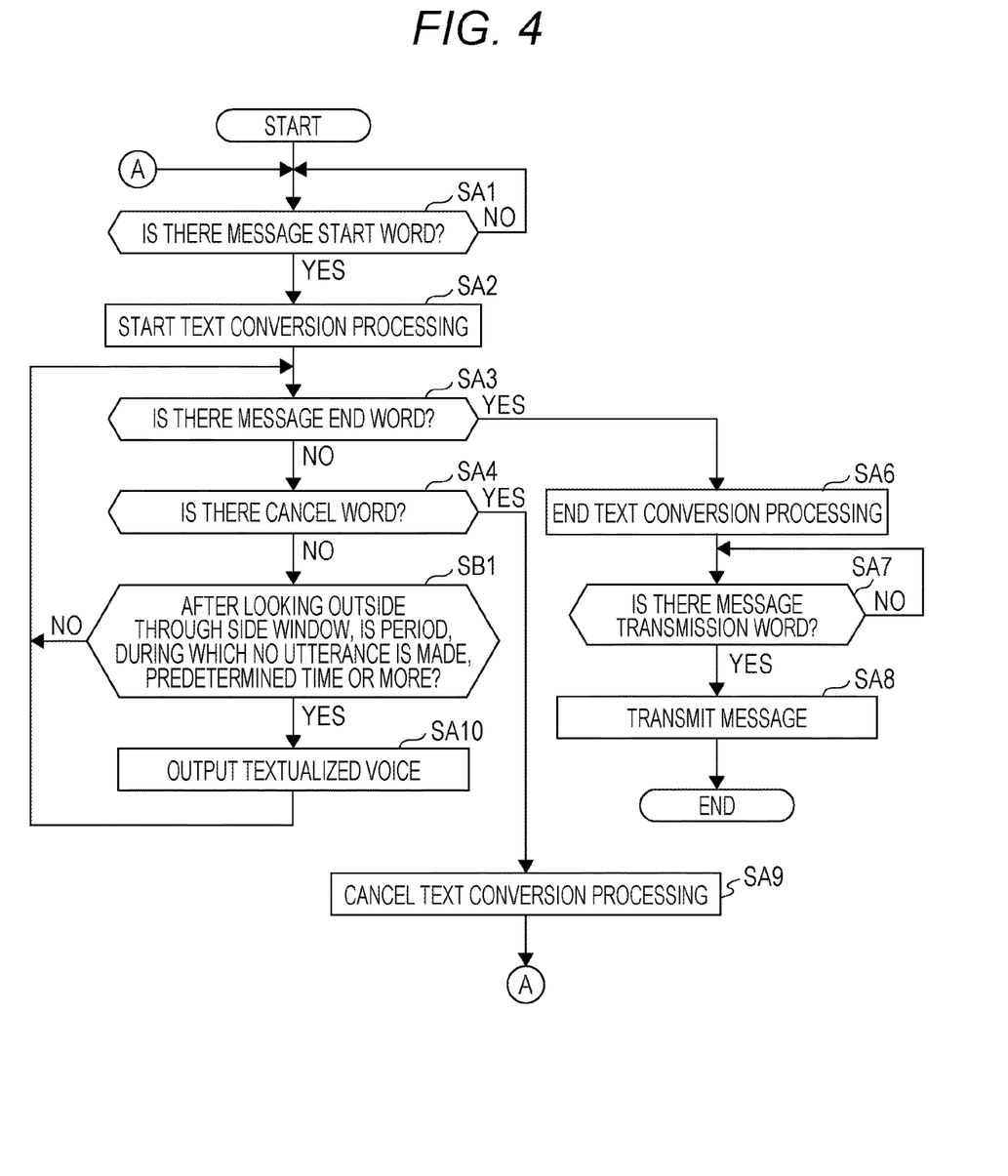
FIG. 4 is a flowchart illustrating an operation example of the voice information processing apparatus according to the second embodiment of the present invention.

Next, an operation of the voice information processing apparatus 1A according to the second embodiment will be described with reference to a flowchart of FIG. 4. In the flowchart of FIG. 4, the same process as that in the flowchart of FIG. 2 is denoted by the same step number, and the description thereof will be omitted. As illustrated in FIG. 4, in step SB1, the voice information processing apparatus 1A according to the second embodiment executes processing different from the processing in step SA5 in FIG. 2. That is, in step SB1, the voice information processing unit 12A monitors whether or not a period in which the driver's voice is not uttered after moving in a mode of looking outside through the side window has become a predetermined time or longer. Then, after the driver's face moves in a mode of looking outside through the side window in step SB1, in a case where a period in which no utterance is further performed is longer than or equal to a predetermined time (step SB1: YES), the processing procedure proceeds to step SA10. Note that, as described in the modification of the first embodiment, the voice information processing unit 12A may be configured to output the recorded voice of the user's utterance instead of the already-textualized voice in the second embodiment.

First Modification of Second Embodiment

Next, a first modification of the second embodiment will be described. In the second embodiment, the voice information processing unit 12A outputs the already-textualized voice in a case where the user's utterance has not been performed for a predetermined time or longer after the user's (driver's) face moves in a mode of looking outside through the side window. However, the voice information processing unit 12A according to the present modification executes the following processing. Note that the present modification is based on the premise that a car navigation device is installed in the host vehicle. The voice information processing unit 12A according to the present modification outputs the already-textualized voice in a case where the user's utterance has not been performed for a predetermined time or longer after the user's face moves in a mode of looking at a display screen of the car navigation device on the basis of the input from the camera 14.

The operation of the voice information processing apparatus 1A according to the present modification will be described with reference to the flowchart of FIG. 4. In step SB1, the voice information processing unit 12A monitors whether or not the user has not uttered for a predetermined time or longer after the user's face moves in a mode of looking at the display screen of the car navigation device.

In a case where the user has not made an utterance to be converted into text for a predetermined time or longer after viewing the display screen of the car navigation device, it can be strongly estimated that the driver has interrupted the utterance to be converted into text due to looking at the display screen. Based on this, according to the present modification, the same effects as those of the second embodiment can be obtained.

Note that, in the second embodiment and the present modification, an example of a configuration has been described in which the voice information processing unit 12A monitors whether or not the user's face has moved in a predetermined manner on the basis of the photographed result of the camera 14, and causes the audio output unit 10 to output a voice related to text that has already been generated in a case where the user has not uttered for a predetermined time or longer after moving in the predetermined manner. However, the example of the configuration is not limited to the example. As an example, the voice information processing unit 12A may be configured to monitor whether or not the user's face has moved in a mode of looking at other occupants other than the user's own face, and execute the corresponding processing, or the voice information processing unit 12A may be configured to monitor whether or not the user's face has moved in a mode of looking at components provided in the host vehicle such as a rearview mirror and a side mirror, and execute the corresponding processing. Furthermore, as described in the modification of the first embodiment, in the first modification of the second embodiment, the voice information processing unit 12A may be configured to output the recorded voice of the user's utterance instead of the already-textualized voice.

Second Modification of Second Embodiment

Next, a second modification of the second embodiment will be described. The voice information processing unit 12A according to the present modification monitors whether or not the user's face has turned into an expression focusing on driving on the basis of the photographed result of the camera 14, and outputs the already-textualized voice in a case where the user's utterance has not been performed for a predetermined time or longer after the user's face has turned into the expression. The monitoring is performed based on existing facial expression recognition technology. It is a matter of course that the monitoring may be performed using a model learned by deep learning or another machine learning method. Note that it is assumed that the driver concentrates on driving and appears as an expression immediately before the host vehicle enters an intersection, while the host vehicle enters the intersection, while the host vehicle is parking in a parking lot, while the host vehicle is traveling on a congested road, or the like.

Describing the operation of the voice information processing apparatus 1A according to the present modification with reference to the flowchart of FIG. 4, in step SB1, the voice information processing unit 12A monitors whether or not the user's utterance has not been performed for a predetermined time or longer after the user's face has turned into an expression of concentrating on driving.

In a case where the utterance to be converted into text has not been performed for a predetermined time or longer after the expression in which the user concentrates on driving, it is possible to strongly estimate that the driver has interrupted the utterance to be converted into text due to the concentration on driving. Therefore, according to the configuration of the present modification, the same effects as those of the second embodiment can be obtained.

Note that, in the present modification, an example of a configuration has been described in which the voice information processing unit 12A monitors whether or not the user's face has the predetermined expression on the basis of the photographed result of the camera 14, and causes the audio output unit 10 to output the voice related to the already-generated text in a case where the user's utterance has not been performed for a predetermined time or longer after the face has the predetermined expression. However, the configuration is not limited to the example. As an example, the voice information processing unit 12A may be configured to monitor whether or not the user's face has a surprised expression and execute corresponding processing. Furthermore, as described in the modification of the first embodiment, in the second modification of the second embodiment, the voice information processing unit 12A may be configured to output the recorded voice of the user's utterance instead of the already-textualized voice.

Third Modification of Second Embodiment

Next, a third modification of the second embodiment will be described. The voice information processing unit 12A according to the present modification monitors whether or not the user has started yawning on the basis of the photographed result of the camera 14. In a case where the voice information processing unit 12A detects that the user has started yawning, the voice information processing unit monitors whether or not the yawning has ended, and outputs an already-textualized voice when it is detected that the yawning has ended. Note that detection of start/end of the yawning is performed on the basis of existing image recognition technology. It is a matter of course that the monitoring may be performed using a model learned by deep learning or another machine learning method.

The operation of the voice information processing apparatus 1A according to the present modification will be described with reference to the flowchart of FIG. 4. In step SB1, the voice information processing unit 12A monitors whether or not the yawning has ended after the user has started yawning.

While the user is yawning, the user can be regarded as having interrupted the utterance to be converted into text due to the yawning. Based on this, according to the configuration of the present modification, the same effects as those of the second embodiment can be obtained. Note that, as described in the modification of the first embodiment, the voice information processing unit 12A may be configured to output the recorded voice of the user's utterance instead of the already-textualized voice in the third modification of the second embodiment.

Fourth Modification of Second Embodiment

Next, a fourth modification of the second embodiment will be described. The voice information processing unit 12A according to the present modification monitors whether or not the user has started a telephone call on the basis of the photographed result of the camera 14. In a case where the voice information processing unit 12A detects that the user has started the call, the voice information processing unit monitors whether or not the call has ended, and outputs the already-textualized voice when detecting that the call has ended. Further, the voice information processing unit 12A stops the conversion of the voice data into text based on the voice input by the voice input unit 11 during a period (a period from the detection of the start to the detection of the end of the call) in which the call by the user is being made. The telephone call of the user is assumed to be a call made by the user using his/her mobile phone in a vehicle.

Note that the detection of the start/end of the call by the user is performed on the basis of existing image recognition technology. It is a matter of course that the monitoring may be performed using a model learned by deep learning or another machine learning method. Furthermore, in the present modification, the voice information processing unit 12A detects the start/end of the call on the basis of the photographed result of the camera 14, but the method of performing the detection is not limited to the illustrated method. As an example, the voice information processing apparatus 1A and the mobile phone may be communicably connected, and a predetermined signal may be transmitted from the mobile phone to the voice information processing apparatus 1A at the start and end of the call, and the voice information processing unit 12A may detect the start/end of the call on the basis of the predetermined signal.

The operation of the voice information processing apparatus 1A according to the present modification will be described with reference to the flowchart of FIG. 4. In step SB1, the voice information processing unit 12A monitors whether or not the call has ended after the user has started the call by the telephone.

While the user is making a telephone call, the user can be regarded as having interrupted the utterance to be converted into text due to the telephone call. Therefore, according to the present modification, the same effects as those of the second embodiment can be obtained. Furthermore, the voice input by the voice input unit 11 during the call is not a voice to be converted into text but a voice for the telephone call, and should not be converted into text. Then, according to the present modification, it is possible to prevent uttered voice that should not be converted into text from being converted into text.

Note that, in the fourth modification, when the voice information processing unit 12A causes the voice output unit 10 to output the already-textualized voice, the following processing may be executed. The voice information processing unit 12A may be configured to cause the audio output unit 10 to output, as a voice, a sentence indicating that the conversion of the voice input by the voice input unit 11 into text has been stopped while the user is talking, together with the already-textualized voice (voice corresponding to the utterance content). For example, the voice information processing unit 12A executes the following processing. The voice information processing unit 12A first outputs the already-textualized voice. Next, the voice information processing unit 12A outputs, as a voice, the text of the context "The voice during a call on the phone is not converted to text. You can continue to input." The voice data that is the source of the voice is prepared in advance. The exemplified processing is merely an example, and for example, the voice information processing unit 12A may be configured to first output a sentence indicating that the voice input unit 11 has stopped converting the input voice into text while the user is talking. as a voice, and then output an already-textualized voice as text.

Furthermore, as described in the modification of the first embodiment, in the fourth modification, the voice information processing unit 12A may be configured to output the recorded voice of the user's utterance instead of the already-textualized voice.

Furthermore, in the third modification and the fourth modification, an example of a configuration has been described in which the voice information processing unit 12A detects that the user has entered the predetermined mode in which the user cannot make the utterance to be converted into text, and after entering the predetermined mode, outputs the already-textualized voice when the predetermined mode is resolved. However, the configuration is not limited to the example. As an example, the voice information processing unit 12A may be configured to detect that the user has started and finished a meal, and output the already-textualized voice when the meal is finished.

The first and second embodiments (including modifications) have been described, but the present invention can be performed in various forms.

For example, in the first embodiment, the transmission of the text by the voice information processing unit 12 is performed as the transmission of the message in the text chat, but the transmission of the text is not limited to the mode illustrated in each embodiment. For example, the text may be transmitted by e-mail. Furthermore, the transmission of the text does not mean only transmission to a specific partner, but is a concept widely including transmission of text to an external device such as transmission of text to a server or a specific host device. For example, transmission of text to a message posting site or a bulletin board site according to a protocol is also included in the transmission of the text. The same applies to the second embodiment.

In the first embodiment, the voice information processing apparatus 1 is provided in the vehicle. However, the voice information processing apparatus 1 is not necessarily a device provided in the vehicle. The same applies to the second embodiment. That is, the present invention is widely applicable to a voice information processing apparatus that converts the user's uttered voice into text.

Furthermore, in each of the above-described embodiments, the voice reception period has been started by the user uttering the message start word. In this regard, the voice reception period may be started when the user performs a predetermined operation on the touch screen or other input means, or when the user performs a predetermined gesture in a configuration capable of detecting a gesture. The same applies to the message end word, the message transmission word, and the cancel word.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A voice information processing apparatus, comprising:
a voice input unit configured to input a voice;
an audio output unit configured to output utterance content of the voice; and
a voice information processing unit connected to a camera configured to photograph a face of a user;
wherein the voice information processing unit is configured to:
convert the voice input by the voice input unit into text during a voice reception period that is a period in which an uttered voice to be converted into text is received from a user;
monitor whether or not the face of the user moves in a predetermined mode based on the photographed result of the camera;
determine that the user is interrupted based on the monitoring that the face of the user moves in the predetermined mode and based on the user not uttering for a predetermined time or longer while the utterance of the user is sequentially converted into text during the voice reception period, and in response to determining that the user is interrupted based on both determinations, automatically output the utterance content of the voice to the audio output unit; and
after automatically outputting the utterance content of the voice to the audio output unit in response to determining that the user is interrupted based on both determining that the face of the user moves in the predetermined mode and based on the user not uttering for a predetermined time or longer, automatically return to convert the voice input by the voice input unit into text during a subsequent voice reception period in which uttered voice received from the user is converted into text.

2. The voice information processing apparatus according to claim 1, wherein:
the voice information processing apparatus is installed in a vehicle, and
the predetermined mode is in a mode in which the user's face looks outside a side window.

3. The voice information processing apparatus according to claim 1, wherein:
the voice information processing apparatus is installed in a vehicle in which a car navigation device is installed, and
the predetermined mode is in a mode in which the user's face looks at a display screen of the car navigation device.

4. The voice information processing apparatus according to claim 1, wherein:
the voice information processing unit is further configured to monitor whether or not the user's face turns into a predetermined expression based on a photographed result of the camera, and after turning into the predetermined expression, to output the voice corresponding to the utterance content to the audio output unit in a case where the user does not utter for a predetermined time or longer.

5. The voice information processing apparatus according to claim 4, wherein:
the voice information processing apparatus is installed in the vehicle, and
the predetermined expression is an expression in which the user's face concentrates on driving.

6. The voice information processing apparatus according to claim 1, wherein the voice information processing unit detects that the user has reached a predetermined mode in which the user does not provide an utterance for textualization, and after the predetermined mode is reached, when the predetermined mode is resolved, the voice corresponding to the utterance content is output to the audio output unit.

7. The voice information processing apparatus according to claim 6, wherein
the voice information processing unit detects that the user has started yawning based on the photographed result of the camera, and after starting yawning, outputs the voice corresponding to the utterance content to the audio output unit when the yawning is finished.

8. The voice information processing apparatus according to claim 6, wherein the voice information processing unit detects that the user has started a telephone call, and after starting the telephone call, the voice information processing unit causes the audio output unit to output a voice corresponding to the utterance content when ending the telephone call, and stops conversion of the voice input by the voice input unit into the text while the telephone call by the user is being made.

9. The voice information processing apparatus according to claim 8, wherein when causing the audio output unit to output the voice corresponding to the utterance content, the voice information processing unit causes the audio output unit to output, as the voice, a sentence indicating that conversion of the voice input by the voice input unit into text has been stopped during a call by the user, together with the voice corresponding to the utterance content.

10. The voice information processing apparatus according to claim 1, wherein when causing the audio output unit to output the utterance content by the voice, the voice information processing unit causes the audio output unit to output a sentence indicated by the text that has already been generated as a voice.

11. The voice information processing apparatus according to claim 1, wherein the voice information processing unit causes a recorded voice of the user's utterance to be output when causing the audio output unit to output the utterance content by the voice.

12. A voice information processing method, comprising:
converting, by a voice information processing unit of a voice information processing apparatus, a voice input by a voice input unit of the voice information processing apparatus into text during a voice reception period, which is a period during which the voice information processing unit of the voice information processing apparatus receives an uttered voice to be converted into the text from a user;
monitoring, by the voice information processing apparatus, whether or not a face of the user moves in a predetermined mode based on photographed result of a camera configured to photograph a face of the user;
determining, by the voice information processing unit, that the user is interrupted based on the monitoring that the face of the user moves in the predetermined mode and based on the user not uttering for a predetermined time or longer while the utterance of the user is sequentially converted into text during the voice reception period, and in response to determining that the user is interrupted based on both determinations, automatically outputting, by the voice information processing unit of the voice information processing apparatus, utterance content already uttered by the user during the voice reception period to an audio output unit of the voice information processing apparatus by the voice; and
after automatically outputting the utterance content of the voice to the audio output unit in response to determining that the user is interrupted based on both determining that the face of the user moves in the predetermined mode and based on the user not uttering for a predetermined time or longer, automatically returning to converting, by the voice information processing unit, the voice input by the voice input unit into text during a subsequent voice reception period in which uttered voice received from the user is converted into text.

13. The voice information processing method according to claim 12, wherein:
the voice information processing unit monitors whether or not the user's face turns into a predetermined expression based on photographed result of the camera, and after turning into the predetermined expression, outputs the voice corresponding to the utterance content to the audio output unit in a case where the user does not utter for a predetermined time or longer.

14. The voice information processing method according to claim 12, wherein the voice information processing unit detects that the user has reached a predetermined mode in which the user does not provide an utterance for textualization, and after the predetermined mode is reached, when the predetermined mode is resolved, the voice corresponding to the utterance content is output to the audio output unit.

15. The voice information processing method according to claim 14, wherein the voice information processing unit detects that the user has started a telephone call, and after starting the telephone call, the voice information processing unit causes the audio output unit to output a voice corresponding to the utterance content when ending the telephone call, and stops conversion of the voice input by the voice input unit into the text while the telephone call by the user is being made.

16. The voice information processing method according to claim 15, wherein when causing the audio output unit to output the voice corresponding to the utterance content, the voice information processing unit causes the audio output unit to output, as the voice, a sentence indicating that conversion of the voice input by the voice input unit into text has been stopped during a call by the user, together with the voice corresponding to the utterance content.

\* \* \* \* \*